Sept. 6, 1938.  K. R. HOYT  2,129,060
PICTURE FILM COLOR CONTROLLING APPARATUS
Filed June 5, 1937
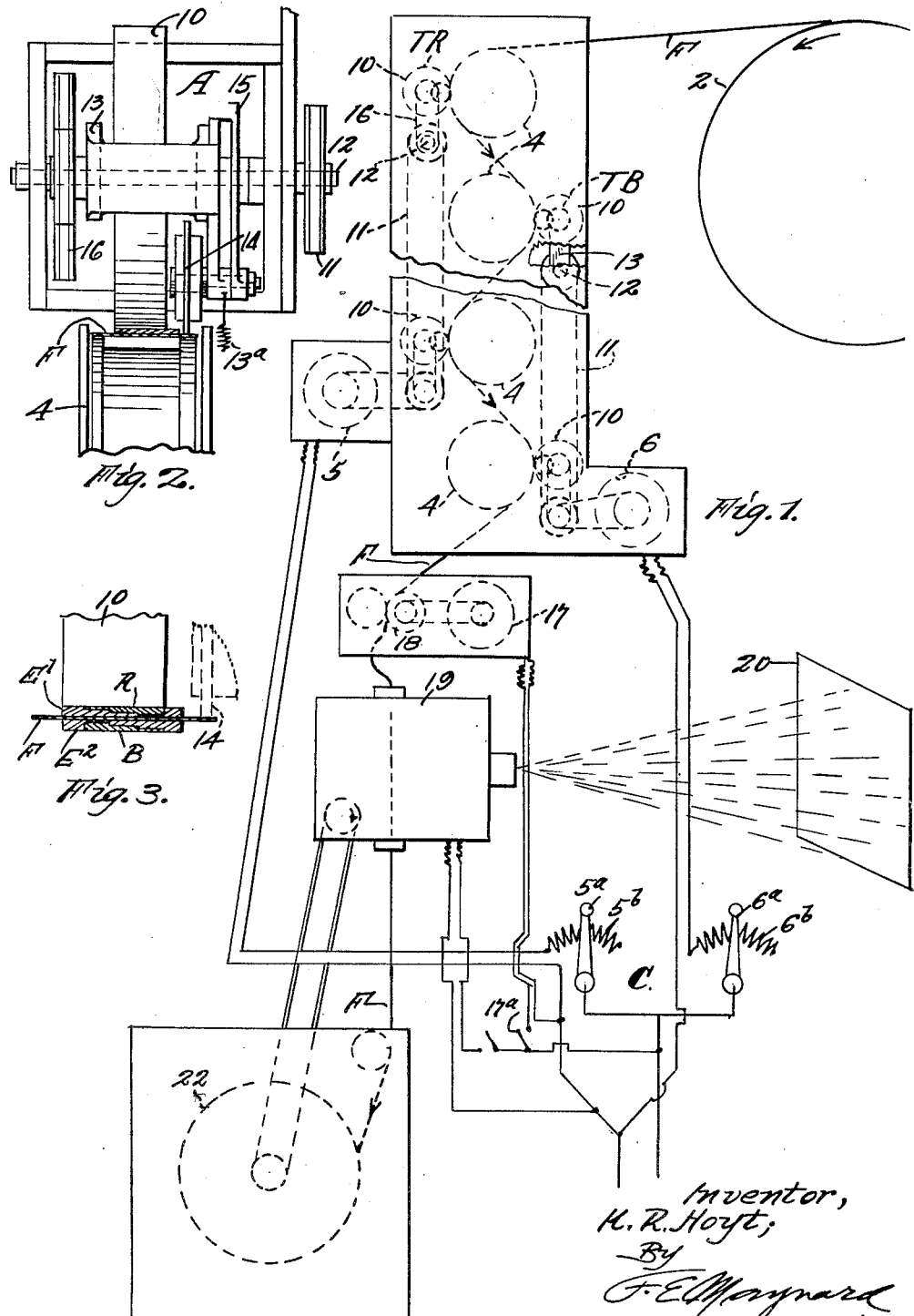
Inventor,
K. R. Hoyt;
By
F. E. Maynard
his Atty Patented Sept. 6, 1938

2,129,060

UNITED STATES PATENT OFFICE 2,129,060

PICTURE FILM COLOR CONTROLLING APPARATUS

Karl Robert Hoyt, North Hollywood, Calif., assignor to Telco Corp., a corporation of California Application June 5, 1937, Serial No. 146,663

5 Claims. (Cl. 51—78)

This invention is a means for treating a motion picture film strip (with or without a sound record) which has been produced directly or indirectly by actinic waves of light of selected color for the purpose of color picture projection.

I have devised a motion picture print having selected-color images defined as depressions or shallow pockets in the face of the relative emulsion and which are filled with a color media of the relative color; that is blue media on a blue image area and red media on red image area. In such a print or other picture image strip the applied color media may project too strong onto a screen relative to the original color of the photographed subject.

Therefore, an object of my present invention is to provide a practical, economical and normal film-speed moving picture projector and treating apparatus whereby to very carefully operate on the color coat or media on the given emulsion or emulsions to reduce the color coat to a proper balance or normal tone of color when projected.

Particularly, an object is to provide apparatus including means for running a motion picture strip or print, such as may be a reproduction from an original master, at the usual projection speed for color scanning of the projected images on a viewing screen, and having readily controllable means, preferably of manual regulation, whereby to effect careful removal of color media if too strong, either on one or both faces of a passing, colored-image film strip.

The invention consists in certain advancements in this art as set forth in the ensuing disclosure and having, with the above, additional objects, advantages as hereinafter developed, and whose construction, combination, and details of means and the manner of operation, and the method, will be made manifest in the description of the embodiment shown in the annexed drawing; it being understood that modifications, variations and adaptations may be resorted to within the scope, principle and spirit of the invention as set forth in the subjoined claims.

Figure 1 is an elevational diagram of the apparatus.

Figure 2 is an end elevation of a polishing assembly of the system.

Figure 3 is an enlarged cross-section of a double emulsion, film strip showing selected-color image pockets in its opposite emulsions as filled with a coat of relative color media.

The print or film strip F has, on one face, a "dupe" negative emulsion E1 in which are image depressions (produced in the original negative by selected color light waves) and these are shown as filled, to the plane of the emulsion face, by a suitable color coat media R (indicating red). The opposite face of the film has a second emulsion E2 and this has selected color image pockets filled with a color coat B (for blue). The film F, here described, has, it is understood, been so prepared and treated that it comes to the apparatus of this invention with the color coated faces of the emulsion in a substantially finished form ready or nearly ready for picture projection use.

It therefore is ready for laboratory color scanning before passing to the market as a finished product.

From a stock reel 2 the strip F passes to duplex trains TR and TB of carefully adjustable, film controlled, polishing wheels 10 each forming a driven element in a respective transmission assembly A.

The wheel train TR is disposed on one peripheral side of a row coplanar, parallel-axis supporting or platen rollers 4 receiving and rotated by the tangentially threaded film strip F; the film being engaged preferably only along its margins by track area of the rollers, Fig. 2, so that the emulsion face is protected from chafing on the rollers.

The train TB of wheels is arranged on the opposite side of the idling rollers 4 to engage only alternate, adjacent rollers. The train TR, for polishing say the red side of the strip emulsion, is driven by a relative actuator, preferably an electric motor 5 and the opposite train TB, on the blue side, is driven by an electric motor 6.

The polishing wheels 10 of each train are connected by suitable transmissions 11 which drive shafts 12 of the respective assemblies. These shafts 12 each forms a pivot for an assembly arm 13 carrying the relative polishing wheel 10. Each arm 13 has a pilot pinion 14 which runs on the naked or emulsionless margin of the adjacent film carried by the relative platen roller 4; the pinion being pulled to the film surface by a spring 13ª attached to the carrying arm 13 and suitably anchored to a fixed frame part (not shown, no claim being made herein to the specific mechanism of the polishing assembly).

Thus each arm 13 and its polishing wheel is controlled by the thickness of the film stock of which the strip F is made after the desired position of the rim of the polishing wheel as to the surface of the film stock has been carefully set. This may be done by an adjustable lever 15 turning an eccentric which carries the relative pinion 14.

From each assembly shaft 12 is a transmission 16 to the relative shaft of the polishing wheel 10 on the arm 13 of the assembly.

The film strip F is drawn between the polishing trains and the platen rollers 4 in a suitable manner as by means of an electric motor 17 driving a feed mechanism 18 and passes into a projector 19 for image projection onto a screen 20 to be scanned by an operator at a control station C. At this station there is a circuit switch 5a operating over a rheostat 5b to control the speed of the motor 5 which drives the wheel train TR.

Also, there is a switch 6a and its rheostat 6b for control of the motor 6 of the polishing train TB. A circuit switch 17a controls the motor 17, and a circuit switch 19a controls the motor 17. The several motors are of synchronous type for effective cooperation at speed of normal rate of advance of film for projection of pictures.

If the scanned, projected images run too strong of blue color the operator adjusts the switch 6a to speed up the motor of the blue side train TB to polish off some of the color coat, and does the same with switch 5a for the red side train TR should the red color be too strong in the projected images.

It will be seen that the excess color is removed by means acting conjunctively in matter of time with the scanning projection of the pictures so that the product will be passed to the market with proper color values in the emulsion images. It is understood that the film may be re-run and re-scanned, by projection, until the desired color value is fixed in the strip images.

What is claimed is:

1. Apparatus for final color balancing of a color coated motion picture film strip, having, in combination, means for advancing the strip, polishing means for operation on the film coat while the film is being advanced, to reduce the coat to the desired tone; said polishing means including a row of rotary, alined track platen wheels on which the film is supported in reverse bights to successively present opposite faces of the film strip bights for application of the relative polishing means.

2. Apparatus as set forth in claim 1, and including concurrently operative, independent drive means for speed regulation of the polishing means on the passing film said polishing means including series of attrition wheels for opposite faces of the film strip.

3. Color control apparatus for treatment of motion picture film strip having color coated emulsions on opposite faces, including polishing mechanisms in position at opposite sides of a portion of the strip, platen means for moving the strip through the polishing means in the form of reversed bights with faces to relative polishing means, and manually controlled means for independently changing the speed of the polishing mechanisms at opposite sides of the strip irrespective of the speed of the strip.

4. Apparatus as in claim 3, and in which the polishing mechanisms each includes a film strip actuated device to control polishing engagement.

5. Color control apparatus for treatment of motion picture film strip having color coat on the emulsion thereof for the projection of colored pictures, including rotary platens presenting aligned strip tracks to support reverse bights of said strip without edgewise twist, separate polishing mechanisms each including film engaging controllers for working on opposite bights of the strip while supported on the platens, means to continuously feed the strip through the platens at a picture projecting speed concurrently with operation of the said mechanisms, and independent manually operable means for controlling the operation of the polishing mechanisms.

KARL ROBT. HOYT.